A. C. MILLER.
Seed-Dropper.
No. 15,431.
Patented July 29, 1856.
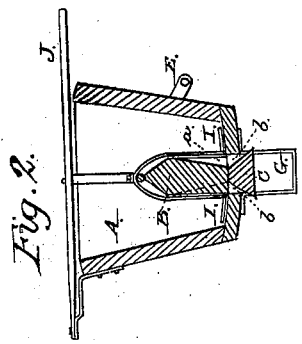
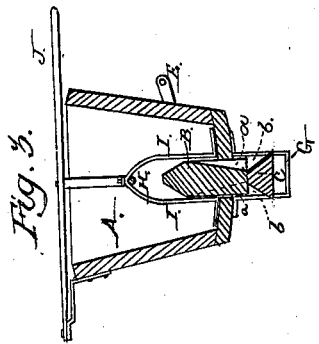
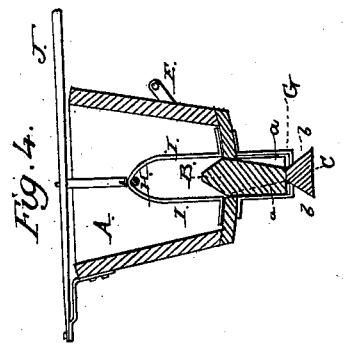
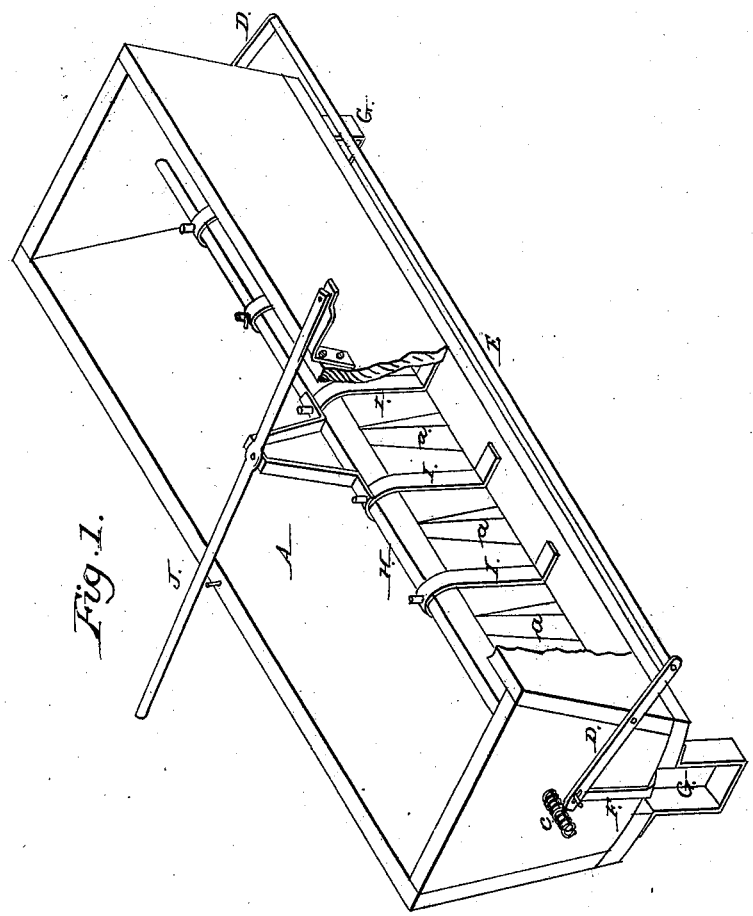

UNITED STATES PATENT OFFICE.

A. C. MILLER, OF MORGANTOWN, VIRGINIA.

IMPROVEMENT IN HAND SEED-PLANTERS.

Specification forming part of Letters Patent No. 15,431, dated July 29, 1856.

*To all whom it may concern:*

Be it known that I, A. C. MILLER, of Morgantown, in the county of Monongalia and State of Virginia, have invented certain new and useful Improvements in Hand Seed-Planters; and I do hereby declare the following to be a full, clear, and exact description of the same, reference being had to the accompanying drawings, making a part thereof, in which—

Figure 1 represents a perspective view of the entire machine. Figs. 2, 3, and 4 represent cross-sections of the same, showing the different positions of the seed-bar as adjusted for different kinds of seeds.

Similar letters, where they occur in the several drawings, denote like parts in all.

The nature of my invention relates to the seed-bar, which is a fixture after it is adjusted, and the vibrating agitators in combination therewith, so that the seed-bar need not be moved through the mass of grain in the hopper, and thus save much of the labor necessary to work the seed-bar.

To enable others skilled in the art to make and use my invention, I will proceed to describe the same with reference to the drawings.

A represents the seed hopper, which has a longitudinal slot in its bottom extending the whole length of the hopper. Into this slot is fitted the seed-bar B, said bar having wedge-shaped openings a on each of its sides, through which the grain may pass from the hopper to the ground. The lower portion, C, of the seed-bar is of a pyramidal form, and the grain, passing through the openings a and falling upon the sides b of the piece C, is thrown off and scattered broadcast.

Two arms, D D, one at each end of the hopper, are pivoted to the hopper, and a rod, E, unites the two outer ends of said arms. To the inner ends of said arms are secured, by a pin passing through a slot therein, as seen in the left of Fig. 1, stirrups F, which are attached respectively to the ends of the seed-bar, (one of the stirrups only being seen,) so that the operator by raising or lowering the rod E may lower or raise the seed-bar B in its slot, and thus correspondingly open or close the passages through a, and adjust the machine to the desired quantity of seed to be sown or the special kind to be sown.

G G are guides at each end of the hopper for the ends of the seed-bar to move up and down in, and to prevent said bar from dropping below a given point, which would let the seeds out of the hopper.

A rod, H, passes through the hopper lengthwise, and upon one end of it is a recoil-spring, c, to throw it back after it has been pushed up by the operator against such coiled spring. Upon this rod is fixed a series of agitators, I, which travel past the openings a as the rod is vibrated by means of the hand-lever J, and thus prevent the seeds from choking in said openings or stopping to run through said openings. These agitators are but thin pieces of metal, and readily pass through the grain in the hopper, whereas to vibrate the seed-bar B for a similar purpose is quite laborious, as it must wade through the entire pressure or weight of grain in the hopper.

I have described the machine as a hand-planter only; but it may be as readily applied to a "horse-planter," as they are termed.

Having thus fully described the nature of my invention, what I claim therein as new, and desire to secure by Letters Patent, is—

In combination with the reciprocating agitators I, the stationary but adjustable seed-bar B, with its wedge-shaped openings a and inclined sides b, for the purpose of sowing seed broadcast and adjusting the machine to the quantity or kind of seeds to be sown, as set forth.

A. C. MILLER.

Witnesses:
  A. HAYMOND,
  JOHN H. SNIDER.